US011844012B2

(12) United States Patent
Shetty et al.

(10) Patent No.: US 11,844,012 B2
(45) Date of Patent: Dec. 12, 2023

(54) MAPPING AND STITCHING NETWORK SLICES ACROSS VARIOUS DOMAINS BASED ON A BORDER GATEWAY PROTOCOL ATTRIBUTE

(71) Applicant: Cisco Technology, Inc., San Jose, CA (US)

(72) Inventors: Rajaneesh Sudhakar Shetty, Karnataka (IN); Ankush Ganpatrai Arora, Maharashtra (IN); Atahar Khan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 17/366,954

(22) Filed: Jul. 2, 2021

(65) Prior Publication Data
US 2023/0007568 A1    Jan. 5, 2023

(51) Int. Cl.
*H04W 48/08*    (2009.01)
*H04W 28/04*    (2009.01)
(Continued)

(52) U.S. Cl.
CPC ........... *H04W 48/08* (2013.01); *H04W 28/04* (2013.01); *H04W 80/04* (2013.01); *H04W 84/042* (2013.01)

(58) Field of Classification Search
CPC .................... H04L 41/0894; H04L 45/74
See application file for complete search history.

(56) References Cited

U.S. PATENT DOCUMENTS

2015/0098468 A1*  4/2015  Kim ................. H04L 45/04
                                                 370/390
2018/0077023 A1   3/2018  Zhang
(Continued)

FOREIGN PATENT DOCUMENTS

EP    3522597    8/2019
EP    3832957    6/2021
(Continued)

OTHER PUBLICATIONS

International Search Report and Written Opinion for PCT Application No. PCT/US2022/035284, dated Oct. 14, 2022, 13 pages.
(Continued)

*Primary Examiner* — Fabricio R Murillo Garcia
(74) *Attorney, Agent, or Firm* — Polsinelli

(57) ABSTRACT

The present technology is directed to generating a common Border Gateway Protocol (BGP) attribute, for example, BGP-Slice Identifier (ID) for a specific network slice and stitching the network slice across one or more domains to realize end-to-end slicing. The present technology can generate BGP ID for a specific network slice spanning a plurality of domains and map domain-specific attributes associated with sub-slices of the specific network slice in different domains of the plurality of domains to the BGP ID. The present technology can further facilitate distribution of the mapping of the domain-specific attributes to the BGP ID across the plurality of domains for stitching the sub-slices together from the domain-specific attributes based on the BGP ID to stitch the specific network slice across the plurality of domains. Furthermore, the present technology can identify a configuration error in the mapping of the domain-specific attributes and the BGP ID and transmit a feedback informing the existence of the error for performing remedial measures.

20 Claims, 9 Drawing Sheets

(51) Int. Cl.
*H04W 80/04* (2009.01)
*H04W 84/04* (2009.01)

(56) References Cited

U.S. PATENT DOCUMENTS

| | | |
|---|---|---|
| 2018/0270744 A1 | 9/2018 | Griot et al. |
| 2019/0037409 A1 | 1/2019 | Wang et al. |
| 2020/0267079 A1* | 8/2020 | Tantsura ................. H04L 45/72 |
| 2021/0083940 A1* | 3/2021 | Peng ................... H04L 41/0894 |
| 2021/0385134 A1* | 12/2021 | Zheng ................. H04L 41/5003 |
| 2022/0027331 A1* | 1/2022 | Hwang ................. G06F 16/215 |
| 2022/0217624 A1* | 7/2022 | Zhang ................... H04W 28/24 |
| 2022/0239568 A1* | 7/2022 | Celozzi ............... H04L 41/5051 |

FOREIGN PATENT DOCUMENTS

| | | |
|---|---|---|
| WO | 2019052406 A1 | 3/2019 |
| WO | 2019081005 | 5/2019 |

OTHER PUBLICATIONS

Chen, R.; Peng, Sh.; ZTE Corporation; "BGP-LS Extensions for Transport Slice", Internet Engineering Task Force, IETF; StandardWorkingDraft, Internet Society (ISOC) 4, Jan. 22, 2020, 19 pages.
Vairavakkalai, K., et al.; "Bgp Classful Transport Planes," Internet Engineering Task Force, IETF, Standard Working Draft, Internet Society (ISOC), No. 8, Jun. 11, 2021, 59 pages.
Rao, Anil, "5G network slicing: cross-domain orchestration and management will drive commercialization", Analysys Mason Limited, Sep. 9, 2020, 22 pages.

* cited by examiner

MAPPING AND STITCHING NETWORK SLICES ACROSS VARIOUS DOMAINS BASED ON A BORDER GATEWAY PROTOCOL ATTRIBUTE

DESCRIPTION OF THE RELATED TECHNOLOGY

The subject matter of this disclosure relates in general to the field of computer networking, and more particularly, to systems and methods for generating a common Border Gateway Protocol (BGP) attribute, for example, BGP-Slice Identifier (ID) for a specific network slice and stitching the network slice across one or more domains based on mapping of the BGP attribute.

BACKGROUND

In a complex 5G environment, various slices are deployed across multiple domains. As such, end-to-end network slicing is becoming a major characteristic of the 5G system where different slices could be tailored for different applications and domains. Currently, no tool provides a unique identifier that can be used in all of the domains consistently to differentiate slices. Due to a complex mapping mechanism across different domains, it is challenging to stitch a slice appropriately across various domains.

DETAILED DESCRIPTION

Figure 1A:
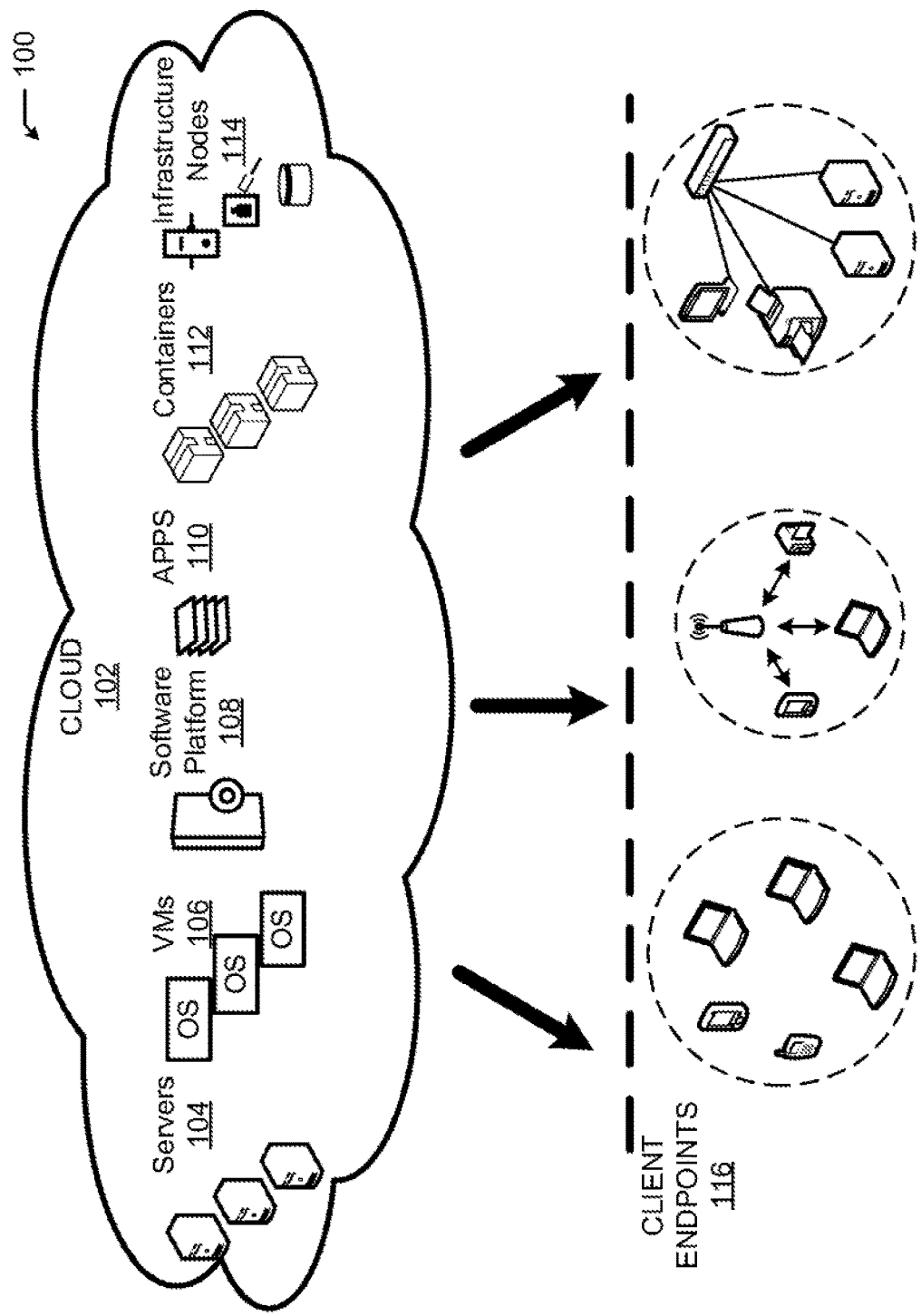
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In a complex 5G environment, various slices are deployed across multiple domains. As such, end-to-end network slicing is becoming a major characteristic of the 5G system where different slices could be tailored for different applications and domains. Currently, no tool provides a unique identifier that can be used in all of the domains consistently to differentiate slices. Each domain has its domain-specific attributes, for example, Segment Routing-Traffic Engineering (SR-TE) or Virtual Private Network (VPN) for transport domain, radio frequency or radio parameters for radio access network (RAN) domain, and Single-Network Slice Selection Assistance Information (s-NSSAI) or Data Network Name (DNN) for core network domain. Also, in enterprise campus domain, security policies (e.g., Scalable Group Tag (SGT)) or different virtual networks (e.g., Virtual Routing and Forwarding (VRF)/Virtual Network (VN)) with reserved resources can be used to differentiate slices. Due to a complex mapping mechanism across different domains and a lack of a unique identifier to differentiate slices in various domains, it is challenging to stitch a slice(s) appropriately across various domains and realize end-to-end slicing.

Therefore, there is a need for generating a common identifier for a specific network slice that can be used for mapping domain-specific attributes and thereby stitching the domain-specific attributes based on the common identifier to stitch the specific network slice across the multiple domains. This way, end-to-end network slicing for a particular slice across multiple domains can be realized with the single common identifier.

The present technology includes systems, methods, and computer-readable media for solving these problems and discrepancies. Specifically, systems, methods, and computer-readable media for generating a common BGP attribute for a specific network slice and stitching the network slice across one or more domains based on mapping of the BGP attribute.

Overview

Methods, systems, and non-transitory computer-readable media are provided for generating a common BGP attribute, for example, BGP-Slice ID for a specific network slice and stitching the network slice across one or more domains based on mapping of the BGP attribute.

The present technology can generate a BGP ID for a specific network slice spanning a plurality of domains, map domain-specific attributes associated with sub-slices of the specific network slice in different domains of the plurality of domains to the BGP ID, and facilitate distribution of the mapping of the domain-specific attributes to the BGP ID across the plurality of domains for stitching the sub-slices together from the domain-specific attributes based on the BGP ID to stitch the specific network slice across the plurality of domains.

The present technology can further transmit corresponding domain-specific subsets of the mapping to each of the plurality of domains and facilitate an exchange of the corresponding domain-specific subsets of the mapping between the plurality of domains in order to facilitate distribution of the mapping of the domain-specific attributes to the BGP ID across the plurality of domains.

The corresponding domain-specific subsets of the mapping can be transmitted to the plurality of domains through corresponding domain-specific templates. The corresponding domain-specific subsets of the mapping can be exchanged between the plurality of domains through BGP updates. Also, a centralized cross-domain orchestrator can transmit the corresponding domain-specific subsets of the mapping to corresponding controllers of the plurality of domains.

Furthermore, the present technology can identify that an error exists in the mapping of the domain-specific attributes and the BGP ID in one of the plurality of domains and transmit feedback informing the existence of the error in the mapping of the domain-specific attributes and the BGP ID from the one of the plurality of domains for performing one or more remedial measures.

The remedial measures can include facilitating redistribution of the mapping of the domain-specific attributes and the BGP ID to the one of the plurality of domains. The remedial measures further comprise performing a slice configuration check in the one of the plurality of domains to detect one or more slice configuration errors in the one of the plurality of domains and conducting one or more slice configuration remedial measures in the one of the plurality of domains in response to detecting the one or more slice configuration errors in the one of the plurality of domains. The slice configuration remedial measures can also include one or a combination of reverting back to a previous slice configuration in the one of the plurality of domains, re-distributing a desired slice configuration to the one of the plurality of domains, and distributing a configuration difference between a current slice configuration and the desired slice configuration to the one of the plurality of domains.

Furthermore, the domain-specific attributes can include a description of characteristics of the sub-slices. The domain-specific attributes can also include one or more parameters to identify a link between the sub-slices across the plurality of domains. The present technology can also determine, at least a portion, of a routing policy for forwarding data across the plurality of domains through one or more network slices including the specific network slice based on the mapping of the domain-specific attributes and the BGP ID. The cross-domain orchestrator can map the domain-specific attributes to a plurality of BGP IDs including the BGP ID.

A system for stitching a network slice across multiple domains based on mapping of a BGP attribute can include one or more processors and at least one computer-readable storage medium storing instructions which, when executed by the one or more processors, cause the one or more processors to generate a BGP ID for a specific network slice spanning a plurality of domains, map domain-specific attributes associated with sub-slices of the specific network slice in different domains of the plurality of domains to the BGP ID, and facilitate distribution of the mapping of the domain-specific attributes to the BGP ID across the plurality of domains for stitching the sub-slices together from the domain-specific attributes based on the BGP ID to stitch the specific network slice across the plurality of domains.

A non-transitory computer-readable storage medium having stored therein instructions which, when executed by one or more processors, can cause the one or more processors to generate a BGP ID for a specific network slice spanning a plurality of domains, map domain-specific attributes associated with sub-slices of the specific network slice in different domains of the plurality of domains to the BGP ID, and facilitate distribution of the mapping of the domain-specific attributes to the BGP ID across the plurality of domains for stitching the sub-slices together from the domain-specific attributes based on the BGP ID to stitch the specific network slice across the plurality of domains.

Description

The disclosed technology addresses the need in the art for generating a common BGP attribute for a specific network slice and stitching the network slice across one or more domains based on mapping of the BGP attribute.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
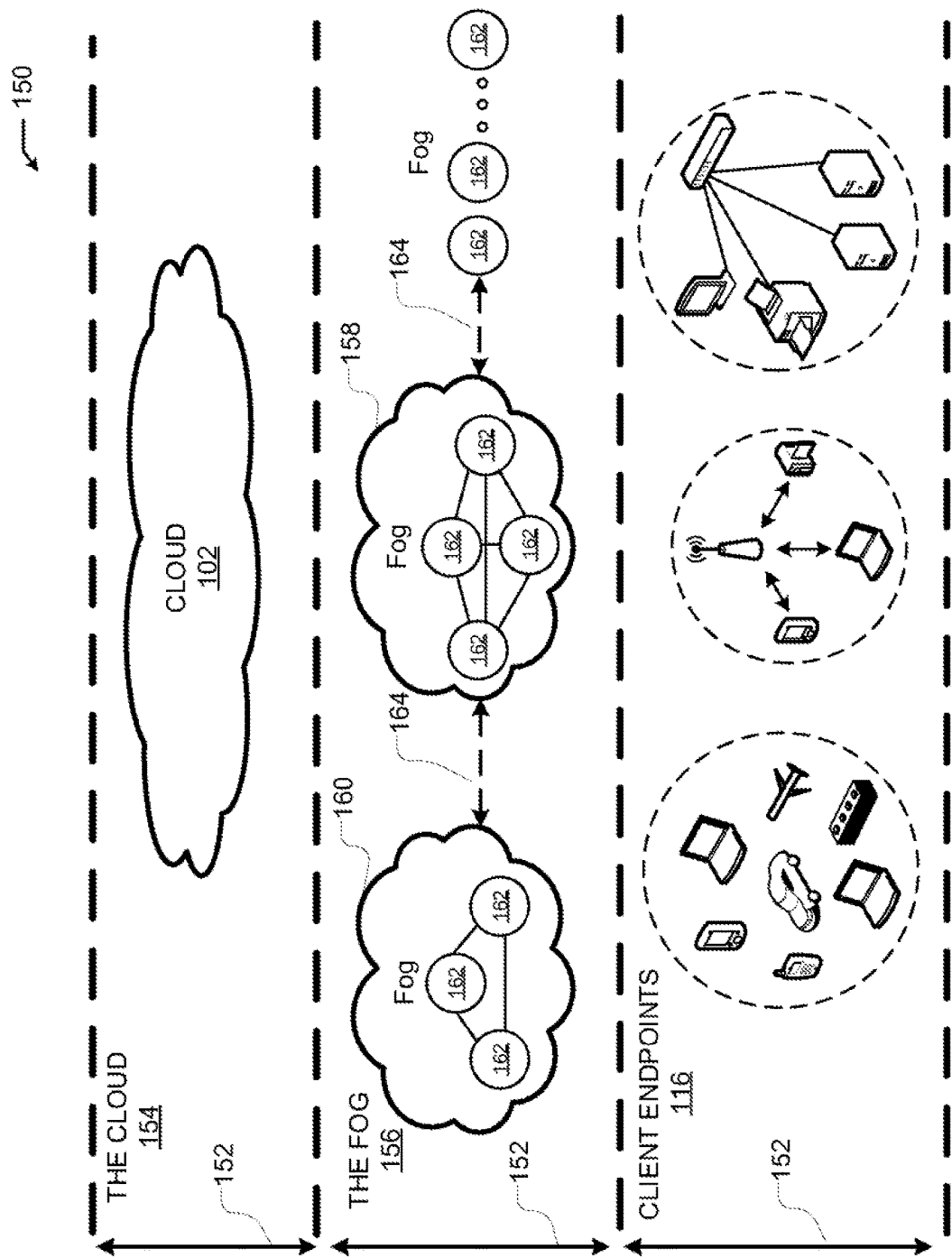
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
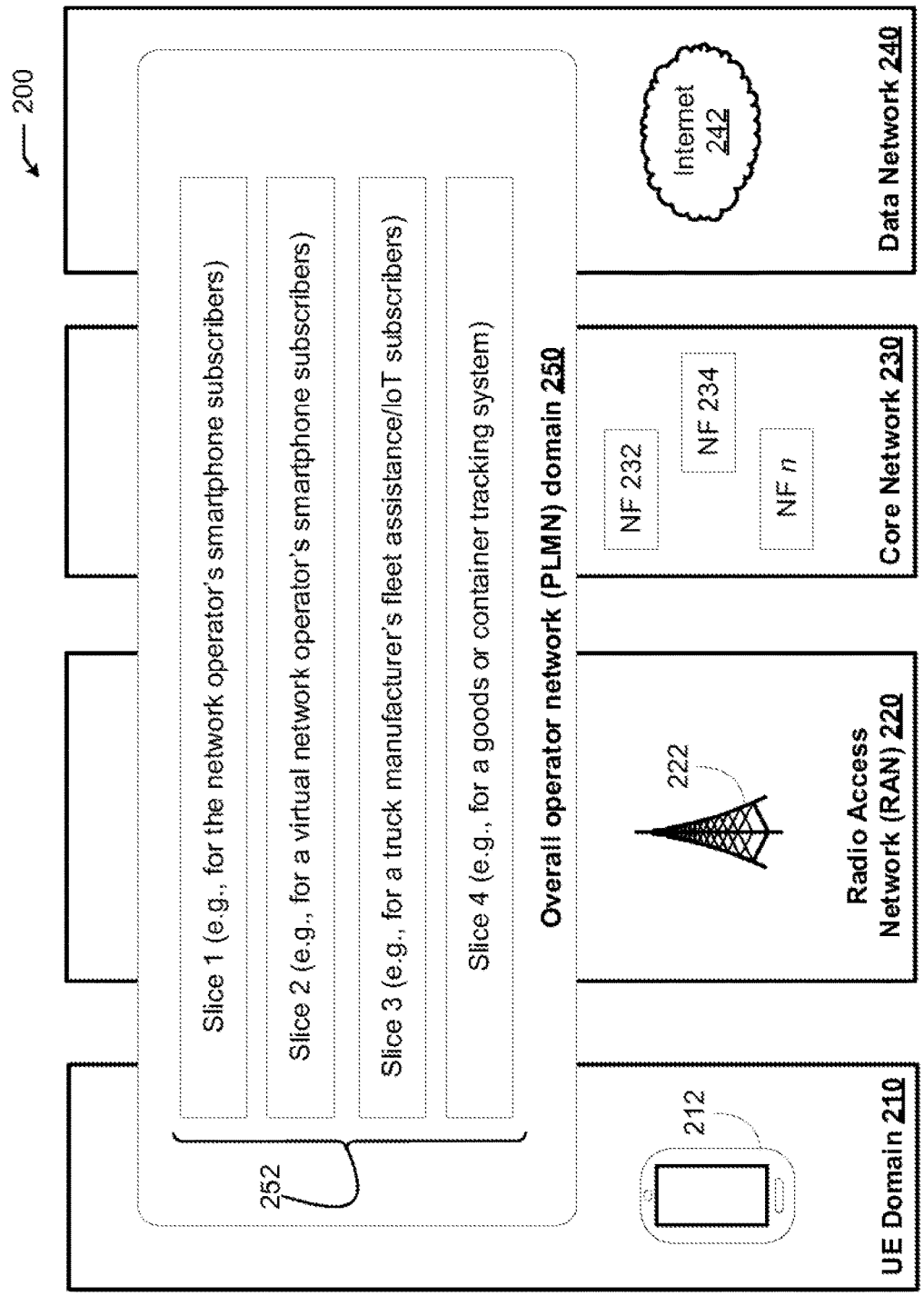
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3:
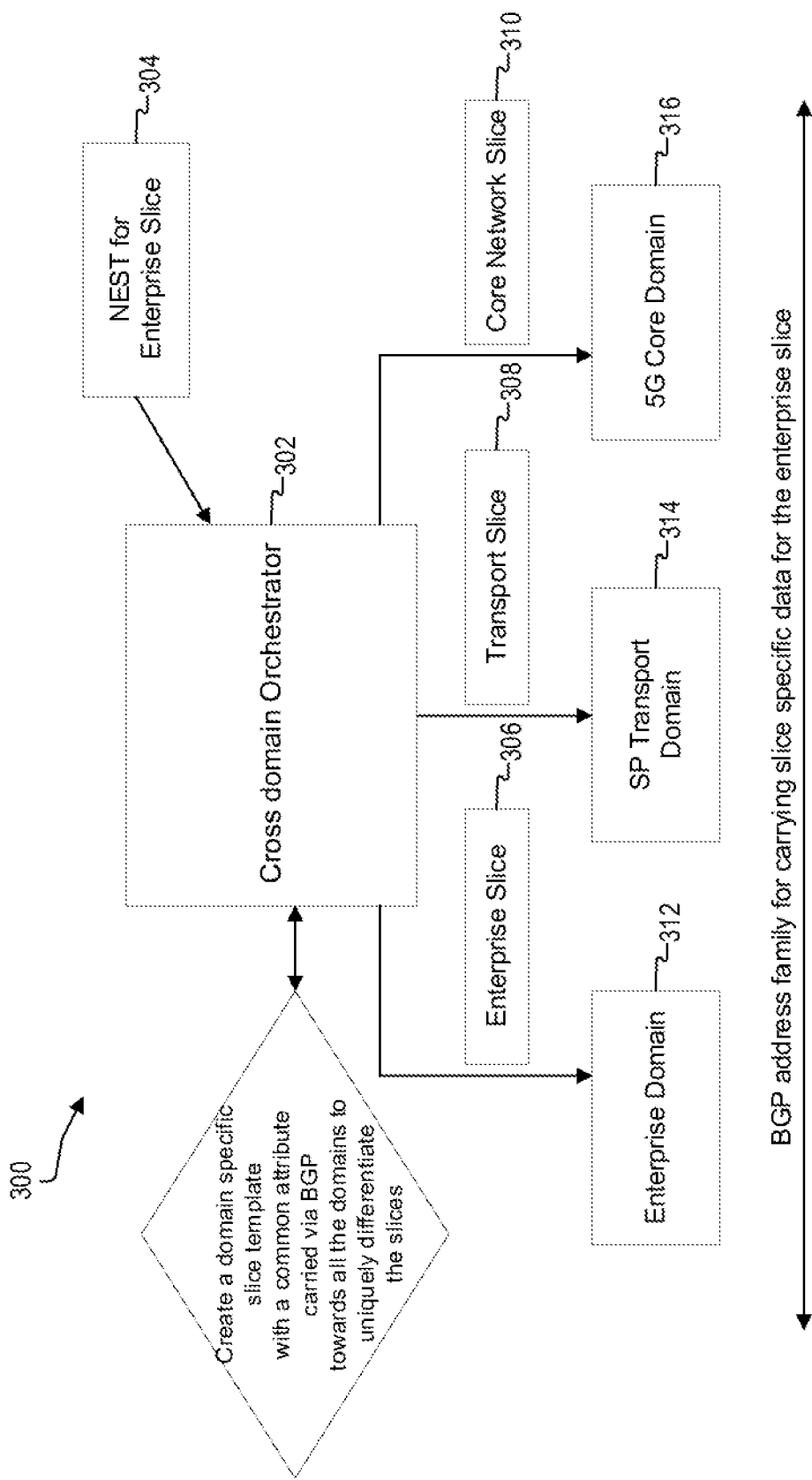
FIG. 3 illustrates an example network environment for generating a common BGP attribute to stitch a network slice across multiple domains according to one or more examples of the present disclosure.

FIG. 3 illustrates an example network environment 300 for generating a common BGP attribute to stitch a network slice across multiple domains according to one or more examples of the present disclosure. The network environment 300 comprises cross-domain orchestrator 302, enterprise domain 312, SP transport domain 314, and 5G core domain 316. While the network environment 300 is shown as being formed across the enterprise domain 312, the SP transport domain 314, and the 5G core domain, these are merely examples of types of domains that can form the network environment 300, and the network environment 300 can be formed by other types of network domains.

The cross-domain orchestrator can generate a common attribute for a specific network slice, e.g. enterprise slice as illustrated in FIG. 3. In turn, the common attribute can be used, as will be discussed in greater detail later, to stitch together the network slice across different domains. The BGP-Slice ID can be an applicable identifier that uniquely identifies a network slice and is capable of being transmitted according to an applicable exterior gateway protocol, such as BGP. For example, the BGP-Slice ID can be an address, a part of an address such as address family identifier (AFI), or a subsequent address family identifier (SAFI). More specifically, the BGP-Slice ID can be part of a new BGP address family that can be carried via BGP towards all the domains (e.g., enterprise domain 312, SP transport domain 314, and 5G core domain 316). In some embodiments, when cross-domain orchestrator 302 receives a network slicing template (NEST) 304 for a specific network slice (e.g., enterprise slice as illustrated in FIG. 3), cross-domain orchestrator 302 can generate a common attribute, for example, a BGP-Slice ID that can be carried via BGP.

Furthermore, the BGP-Slice ID can be used for mapping domain-specific attributes associated with sub-slices (e.g., enterprise slice 306, transport slice 308, and core network slice 310) in different domains (e.g., enterprise domain 312, SP transport domain 314, and 5G core domain 316). The domain-specific attributes can be a SGT for enterprise domain 312, SR-TE for SP transport domain 314, and s-NSSAI for 5G core domain 316. For example, an enterprise network can implement SGT to reserve resources within the enterprise network. Similarly, a SP transport network can implement SR-TE to reserve resources on the transport network. 5G core network can implement S-NSSAI to reserve resources on the 5G core network. All of the domain-specific attributes (e.g., SGT, SR-TE, and s-NSSAI) in different domains can be mapped to the BGP-Slice ID. For example, the mapping can be written as "BGP-SliceID: SGT: SR-TE: s-NSSAI."

In some embodiments, cross-domain orchestrator 302 can transmit corresponding domain-specific subsets of the mapping to each of the multiple domains. Specifically, cross-domain orchestrator 302 can transmit a portion of the mapping related to attributes of the enterprise domain (e.g., SGT) to enterprise domain 312. Also, cross-domain orchestrator 302 can transmit a portion of the mapping related to attributes of the transport domain (e.g., SR-TE) to transport domain 314 and a portion of the mapping related to attributes of the 5G core domain (e.g., s-NSSAI) to 5G core domain 316. For example, "BGP-SliceID: SGT" associated with enterprise slice 306 can be transmitted to enterprise domain 312. Similarly, "BGP-SliceID: SR-TE" associated with transport slice 308 can be transmitted to SP transport domain 314 while "BGP-SliceID: s-NSSAI" associated with core network slice 310 can be transmitted to 5G core domain 316.

Furthermore, the mapping can be distributed across multiple domains (e.g., enterprise domain 312, SP transport domain 314, and 5G core domain 316) so that the sub-slices (e.g., enterprise slice 306, transport slice 308, and core network slice 310) can be stitched together based on the BGP-Slice ID to stitch the specific network slice included in the NEST 304 across the multiple domains. Stitching a slice across a plurality of domains, as used herein, can include associating or otherwise linking together corresponding sub-slices of the slice that exist in respective domains of the plurality of domains such that the slice can be conceptually formed across the plurality of domains. More specifically, the corresponding sub-slices can be stitched together across the plurality of domains to form the stitched slice across the plurality of domains.

In some embodiments, the mapping can capture an optional description of characteristics of the sub-slices or the mapping such as purpose or usage. For example, for an end-to-end slicing for an Ultra Reliable Low Latency Communication (URLLC) application (e.g., remote-surgery), the mapping can be written as "BGP-SliceID: description—URLLC for Remote-Surgery: SGT: SR-TE: s-NSSAI."

In some embodiments, the domain-specific attributes can include a parameter(s) to identify a link between the sub-slices across the multiple domains. The parameter(s) can advertise a source IP address and/or next-hop IP address to determine the next-hop between adjacent domains. For example, when a network device (e.g., an edge router) in enterprise network has more than one links connected to another network device in SP transport network, a BGP-Slice ID can include a parameter identifying a link for stitching a slice to the adjacent SP transport domain. For example, the mapping can be "BGP-Slice ID: SR-TE next-hop via IP-Address x.x.xxx." The parameter can identify a source IP or a local domain. For example, the mapping can be written as "BGP-Slice ID: SGT via local interface-X" or "BGP-Slice ID: SR-TE: s-NSSAI next-hop via IP-Address x.x.xx." Based on the parameters indicating the source IP address and/or next-hop IP address, a network device can discover and form an end-to-end network slicing for a particular slice across various domains. An example of a complete mapping can be written as "BGP-Slice ID: description—URLLC for Remote-Surgery: SGT: SR-TE: s-NSSAI next-hop via IP-Address x.x.xx."

Furthermore, the mapping of domain-specific attributes to a BGP-Slice ID has an advantage of providing knowledge about the slice being active across different domains or local to the current domain. Accordingly, a domain controller can determine resource reservations policy or prioritization of the respective domain.

In some embodiments, a routing policy for forwarding data across the multiple domains through the network sub-slices can be determined based on the mapping of the domain-specific attributes and the BGP-Slice ID. Specifically, network devices can identify, based on the mapping, associated interfaces and/or services and direct the traffic with a suitable resource reservation (e.g., BGP-based EVPN/L3VPN in SP transport domain to SGT or VN mapping in enterprise domain). For example, traffic routing policies between the domain can be determined or mapped based on the identification of the mapping points, interfaces, or IP addresses in adjacent domains for the associated end-to-end slice. As such, an end-to-end slicing can be realized across multiple domains where BGP is extended.

In some embodiments, a single BGP-Slice ID can map to multiple domain-specific attributes (e.g., SGT or VN in enterprise domain). Also, one or more BGP-Slice ID can map to a single domain-specific attribute.

Although the example network environment 300 in FIG. 3 comprises three domains, an applicable number of domains can be included in the same fashion.

Figure 4:
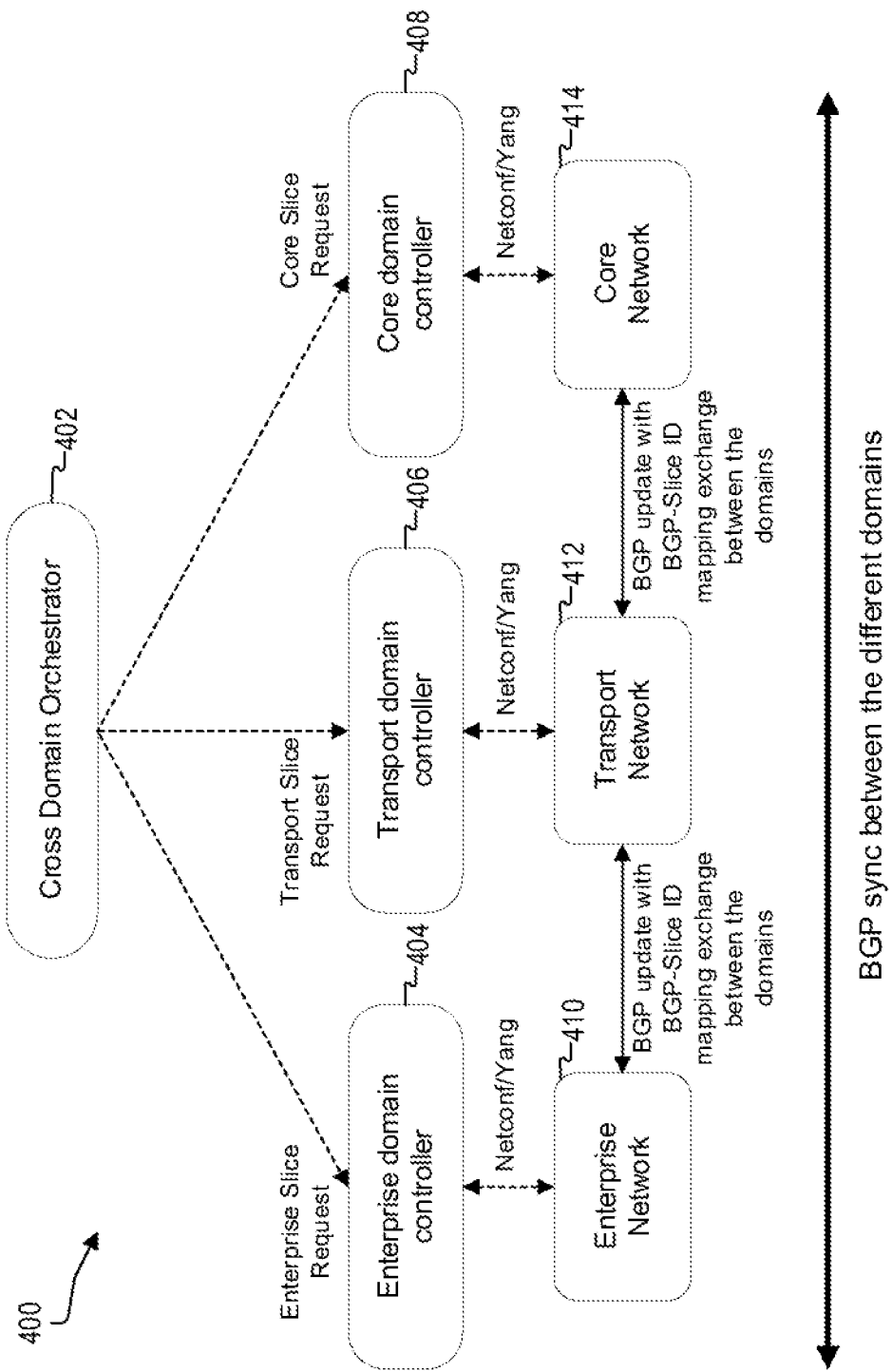
FIG. 4 illustrates an example network environment where a mapping of domain-specific attributes to a common BGP attribute is distributed across multiple domains according to one or more examples of the present disclosure.

FIG. 4 illustrates an example network environment 400 where mapping of domain-specific attributes to a common BGP attribute is distributed across multiple domains according to one or more examples of the present disclosure. The network environment 400 comprises cross-domain orchestrator 402, enterprise domain controller 404 in enterprise network 410, transport domain controller 406 in transport network 412, and core domain controller 408 in core network 414.

In some embodiments, cross-domain orchestrator 402 can facilitate the distribution of the mapping of the domain-specific attributes to the BGP-Slice ID across the multiple domains. As previously described with respect to FIG. 3, cross-domain orchestrator 402 can distribute a subset of the mapping to the corresponding domain. For example, cross-domain orchestrator 402 can transmit the mapping of the domain-specific attributes to the BGP-Slice ID to each domain controller (e.g., enterprise domain controller 404, transport domain controller 406, and core domain controller 408) of the respective domain. That is, enterprise domain controller 404 can receive the mapping of SGT or VN. Similarly, SP transport domain can receive the mapping of SR-TE, Flexible Algorithms (Flex Algo), or VPN while 5G core domain can receive the mapping of s-NSSAI or DNN.

In some embodiments, each domain controller (e.g., enterprise domain controller 404, transport domain controller 406, and core domain controller 408) can transmit the mapping to network devices in the respective network (enterprise network 410, transport network 412, and core network 414). Then, each network device can advertise the mapping via BGP updates to other network devices.

In some embodiments, each domain controller (e.g., enterprise domain controller 404, transport domain controller 406, and core domain controller 408) and cross-domain orchestrator 402 can use Netconf/Yang to change a configuration of a network slice, i.e., to create, modify, or delete a slice.

Figure 5:
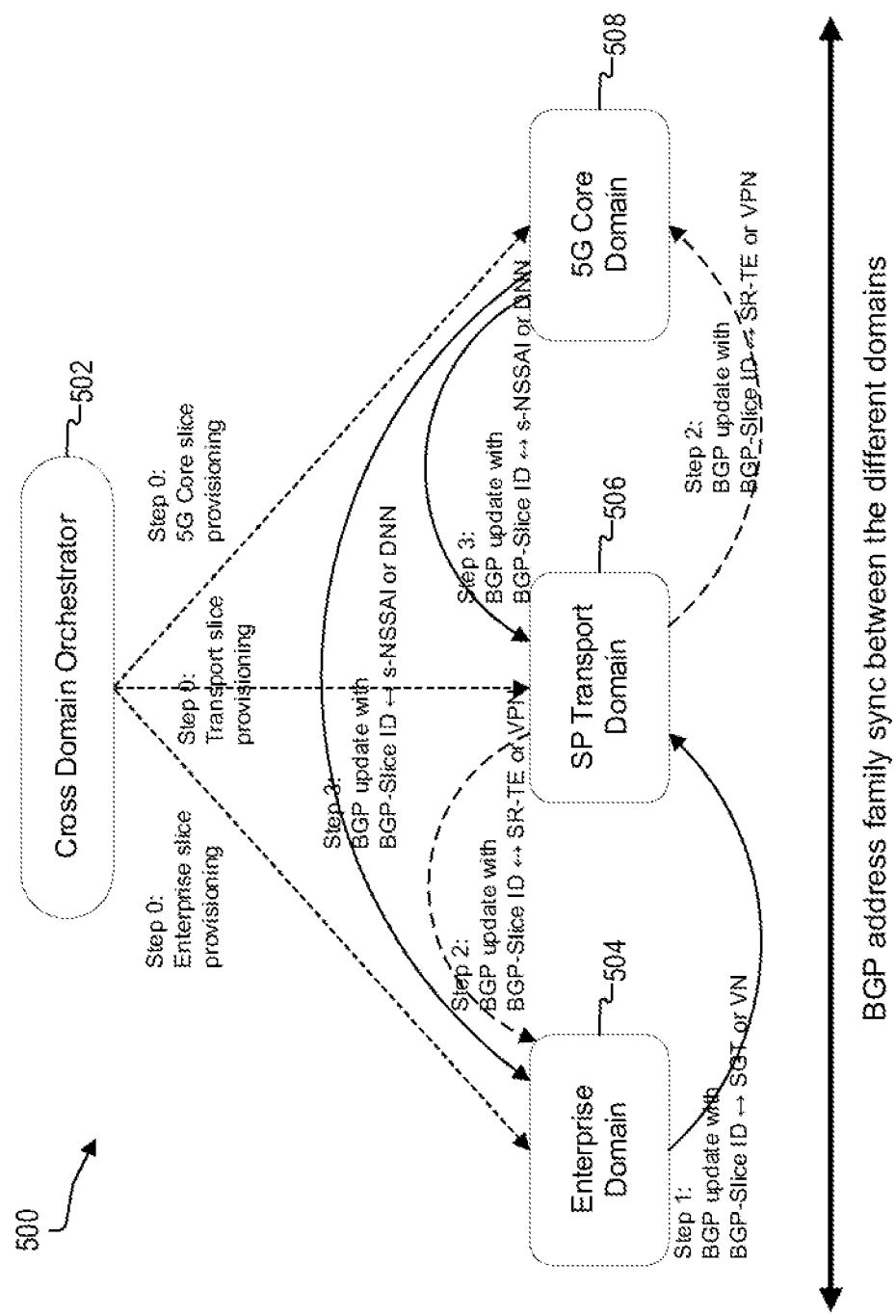
FIG. 5 illustrates an example network environment showing an exchange of a mapping of domain-specific attributes to a common BGP attribute between multiple domains according to one or more examples of the present disclosure.

FIG. 5 illustrates an example network environment 500 showing an exchange of mapping of domain-specific attributes to a common BGP attribute between multiple domains according to one or more examples of the present disclosure. The network environment 500 comprises cross-domain orchestrator 502, enterprise domain 504, SP transport domain 506, and 5G core domain 508.

In some embodiments, as illustrated in FIG. 5 at step 0, when cross-domain orchestrator 502 generates a BGP-Slice ID and maps domain-specific attributes (e.g., SGT or VN for enterprise domain 504, SR-TE or VPN for transport domain 506, and s-NSSAI or DNN for 5G core domain 508) to the BGP-Slice ID, cross-domain orchestrator 502 can transmit corresponding domain-specific subsets of the mapping to each of the multiple domains (e.g., enterprise domain 504, SP transport domain 506, and 5G core domain 508).

Furthermore, the mapping of the BGP-Slice ID can be exchanged between the multiple domains in the network through BGP updates to achieve end-to-end slicing. In other words, each domain (e.g., enterprise domain 504, SP transport domain 506, and 5G core domain 508) can advertise the mapping of BGP-Slice ID to the respective domain slice identifiers through BGP updates. For example, a portion of the mapping of BGP-Slice ID related to SGT or VN can be transmitted from enterprise domain 504 to SP transport domain 506 via BGP updates at step 1 in FIG. 5. Similarly, a portion of the mapping of BGP-Slice ID related to SR-TE or VPN can be transmitted from SP transport domain 506 to 5G core domain 508 and enterprise domain 504 via BGP updates at step 2. Also, a portion of the mapping of BGP-Slice ID related to s-NSSAI or DNN can be transmitted from 5G core domain 508 to SP transport domain 506 and enterprise domain 504 at step 3 in FIG. 5.

In some embodiments, the mapping of domain-specific attributes to the BGP-Slice ID can be exchanged between the multiple domains through BGP updates, more specifically a new BGP address family such as AFI/SAFI. The BGP updates can be exchanged as a control plane update between the multiple domains. Also, the BGP-Slice ID can be defined as an optional transitive BGP attribute that has a global significance, i.e., the BGP-Slice ID might or might not be recognized by a BGP router but is passed on to other BGP routers. The BGP-Slice ID can be a unique parameter across the multiple domains to identify the end-to-end slicing.

Furthermore, the corresponding domain-specific subsets of the mapping can be transmitted to the multiple domains through corresponding domain-specific templates.

Figure 6:
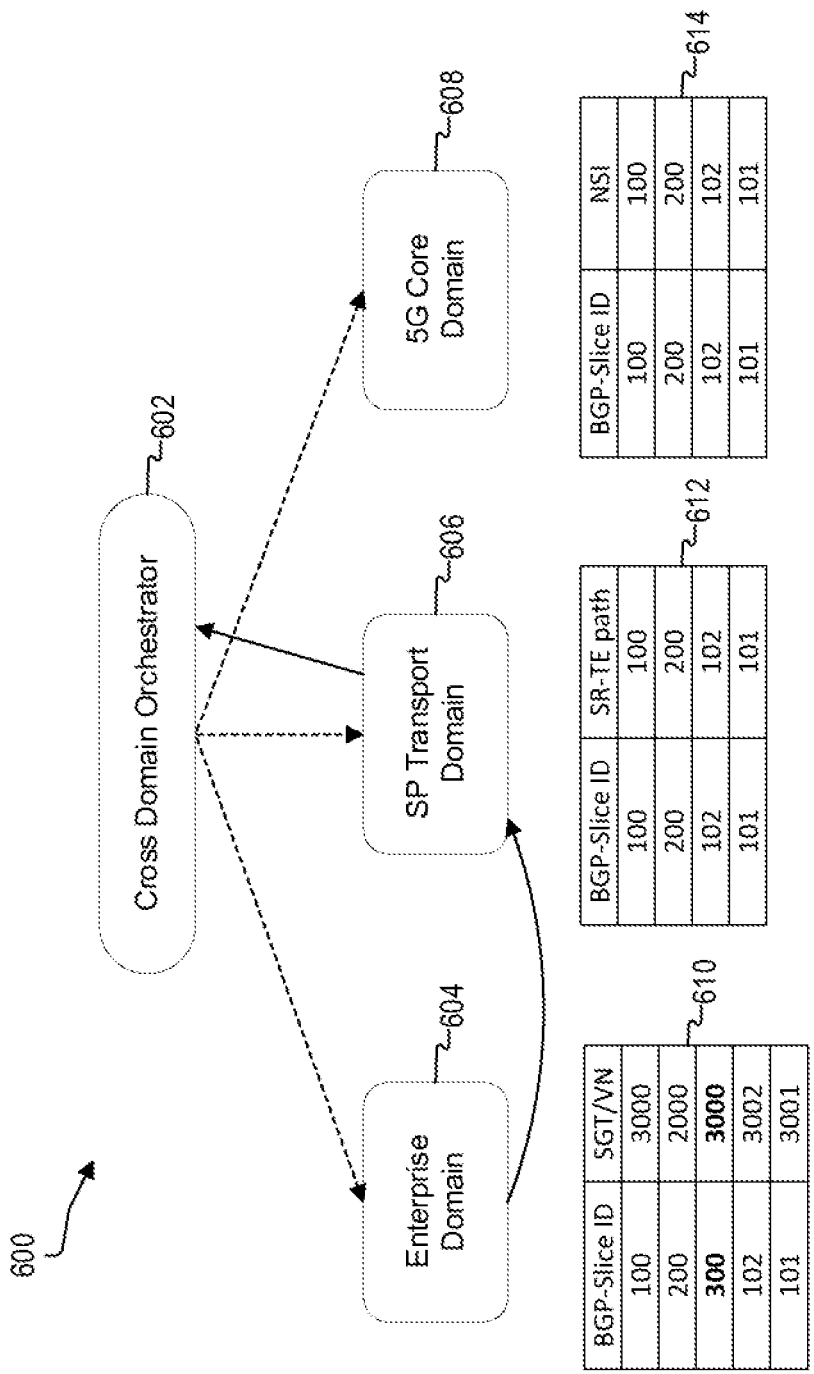
FIG. 6 illustrates an example network environment for providing feedback on a slice configuration error according to one or more examples of the present disclosure.

FIG. 6 illustrates an example network environment 600 for providing feedback on a slice configuration error according to one or more examples of the present disclosure. The network environment 600 comprises cross-domain orchestrator 602, enterprise domain 604, service provide transport domain 606, and 5G core domain 608. Each domain includes a BGP-Slice ID mapping table, e.g., mapping table 610 for enterprise domain, mapping table 612 for transport domain, mapping table 614 for 5G core domain.

In some embodiments, when the mapping of the domain-specific attributes and the BGP-Slice ID includes a configuration error in one of the multiple domains, a network device or a domain controller in the domain where the configuration error is identified can transmit feedback to cross-domain orchestrator 602 informing of the existence of the error. The feedback can be transmitted to cross-domain orchestrator 602 via an Application Programming Interface (API) using the BGP-Slice ID as a detection parameter.

For example, when a portion of the mapping of domain-specific attributes to the BGP-Slice ID related to enterprise domain (e.g., SGT) is transmitted from enterprise domain 604 to SP transport domain 606 (i.e., enterprise domain 604 advertises the mapping of BGP-Slice ID to SP transport domain 606 via BGP updates), SP transport domain 606 via a network device or a domain controller therein can identify an extra mapping of a particular BGP-Slice ID (e.g., BGP-Slice ID 300), which is missing in mapping table 612 of SP transport domain 606 or in mapping table 614 of 5G core domain 608. Then, SP transport domain 606 via a network device or a domain controller therein can transmit a feedback informing the existence of the error to cross-domain orchestrator 602. In response to the feedback, cross-domain orchestrator 602 can take remedial measures to correct the configuration error.

As one of the remedial measures, cross-domain orchestrator 602 can facilitate redistribution of the mapping of the domain-specific attributes and the BGP-Slice ID within the multiple domains including enterprise domain 604, SP transport domain 606, and 5G core domain 608 in the network 600.

In some embodiments, cross-domain orchestrator 602 can perform a slice configuration check in the domain where the configuration error is identified to detect the slice configuration error in the domain and further conduct slice configuration remedial measures in the domain in response to the detection of the slice configuration error in the domain. For example, cross-domain orchestrator 602 can revert back to a previous slice configuration in the domain, redistribute a desired slice configuration to the domain, or distribute a configuration difference between a current slice configuration and the desired slice configuration to the domain.

Figure 7:
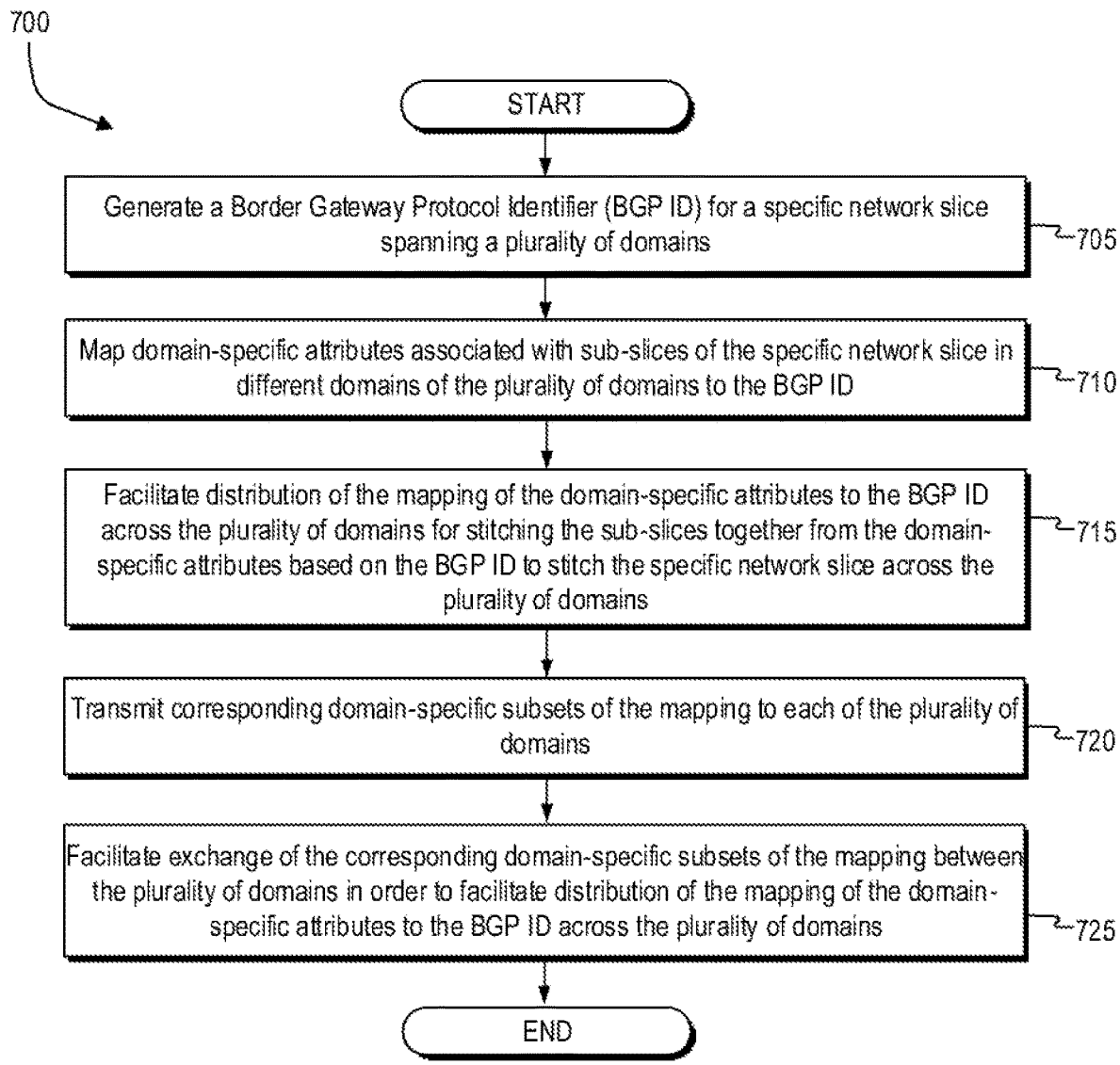
FIG. 7 illustrates a flowchart of a method for generating a common BGP attribute to stitch a network slice across multiple domains according to one or more examples of the present disclosure.

FIG. 7 illustrates a flowchart 700 of a method for generating a common BGP attribute to stitch a network slice across multiple domains according to one or more examples of the present disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method includes generating a BGP ID (i.e., BGP-Slice ID) for a specific network slice spanning a plurality of domains at step 705. For example, cross-domain orchestrator 302 illustrated in FIG. 3 (also, cross-domain orchestrator 402, 502, and 602 in FIGS. 4-6, respectively) may generate a BGP ID for a specific network slice spanning a plurality of domains including enterprise domain 312, SP transport domain 314, and 5G core domain 316.

According to some examples, the method includes mapping domain-specific attributes associated with sub-slices of the specific network slice in different domains of the plurality of domains to the BGP ID at step 710. For example, cross-domain orchestrator 302 illustrated in FIG. 3 may map domain-specific attributes (e.g., SGT, SR-TE, or s-NSSAI) associated with sub-slices (e.g., enterprise slice 306, transport slice 308, or core network slice 310) of the specific network slice in different domains of the plurality of domains (e.g., enterprise domain 312, SP transport domain 314, and 5G core domain 316) to the BGP ID. The domain-specific attributes can include a description of characteristics of the sub-slices. Furthermore, the domain-specific attributes can include one or more parameters to identify a link between the sub-slices across the plurality of domains.

Additionally, in some examples, the method comprises determining, at least a portion, of a routing policy for forwarding data across the plurality of domains through one or more network slices including the specific network slice based on the mapping of the domain-specific attributes and the BGP ID. For example, cross-domain orchestrator 302 illustrated in FIG. 3 may determine, at least a portion, of a routing policy for forwarding data across the plurality of domains (e.g., enterprise domain 312, SP transport domain 314, and 5G core domain 316) through one or more network slices including the specific network slice based on the mapping of the domain-specific attributes and the BGP ID.

Furthermore, the method comprises mapping the domain-specific attributes to a plurality of BGP IDs including the BGP ID. For example, cross-domain orchestrator 302 illustrated in FIG. 3 may map the domain-specific attributes to a plurality of BGP IDs including the BGP ID.

According to some examples, the method includes facilitating distribution of the mapping of the domain-specific attributes to the BGP ID across the plurality of domains for stitching the sub-slices together from the domain-specific attributes based on the BGP ID to stitch the specific network slice across the plurality of domains at step 715. For example, cross-domain orchestrator 302 illustrated in FIG. 3 may facilitate distribution of the mapping of the domain-specific attributes to the BGP ID across the plurality of domains (e.g., enterprise domain 312, SP transport domain 314, and 5G core domain 316) for stitching the sub-slices (e.g., enterprise slice 306, transport slice 308, or core network slice 310) together from the domain-specific attributes based on the BGP ID to stitch the specific network slice across the plurality of domains, thereby realizing an end-to-end slicing.

According to some examples, the method includes transmitting corresponding domain-specific subsets of the mapping to each of the plurality of domains at step 720. For example, cross-domain orchestrator 302 illustrated in FIG. 3 may transmit corresponding domain-specific subsets of the mapping to each of the plurality of domains (e.g., enterprise domain 312, SP transport domain 314, and 5G core domain 316). In other words, the corresponding domain-specific subsets of the mapping can be transmitted to corresponding controllers (e.g., enterprise domain controller 404, transport domain controller 406, or core domain controller 408 illustrated in FIG. 4) of the plurality of domains from the centralized cross-domain orchestrator (e.g., cross-domain orchestrator 402 illustrated in FIG. 4). Furthermore, the corresponding domain-specific subsets of the mapping can be transmitted to the plurality of domains through corresponding domain-specific templates.

According to some examples, the method includes facilitating exchange of the corresponding domain-specific subsets of the mapping between the plurality of domains in order to facilitate distribution of the mapping of the domain-specific attributes to the BGP ID across the plurality of domains at step 725. For example, the corresponding domain-specific subsets of the mapping can be exchanged between the plurality of domains (e.g., enterprise domain 312, SP transport domain 314, and 5G core domain 316) in order to facilitate distribution of the mapping of the domain-specific attributes to the BGP ID across the plurality of domains. The corresponding domain-specific subsets of the mapping can be exchanged between the plurality of domains through BGP updates.

According to some examples, the method includes identifying that an error exists in the mapping of the domain-specific attributes and the BGP ID in at least one of the plurality of domains. For example, a domain controller (e.g., enterprise domain controller 404, transport domain controller 406, or core domain controller 408 illustrated in FIG. 4) or a network device in the respective domain may identify that an error exists in the mapping of the domain-specific attributes and the BGP ID in at least one of the plurality of domains.

According to some examples, the method includes transmitting a feedback informing the existence of the error in the mapping of the domain-specific attributes and the BGP ID from the one of the plurality of domains for performing one or more remedial measures. For example, a domain controller such as enterprise domain controller 404, transport domain controller 406, or core domain controller 408 illustrated in FIG. 4 or a network device in the respective domain may transmit a feedback informing the existence of the error in the mapping of the domain-specific attributes and the BGP ID from the one of the plurality of domains for perform one or more remedial measures. One or more remedial measures includes facilitating redistribution of the mapping of the domain-specific attributes and the BGP ID to the one of the plurality of domains. Also, the remedial measures include one or a combination of reverting back to a previous slice configuration in the one of the plurality of domains, re-distributing a desired slice configuration to the one of the plurality of domains, and distributing a difference configuration between a current slice configuration and the desired slice configuration to the one of the plurality of domains.

Furthermore, the method comprises performing a slice configuration check in the one of the plurality of domains to detect one or more slice configuration errors in the at least one of the plurality of domains. For example, cross-domain orchestrator 302 illustrated in FIG. 3 may perform a slice configuration check in the at least one of the plurality of domains to detect one or more slice configuration errors in the at least one of the plurality of domains.

Further, the method comprises conducting one or more slice configuration remedial measures in the at least one of the plurality of domains in response to detecting the one or more slice configuration errors in the one of the plurality of domains. For example, cross-domain orchestrator 302 illustrated in FIG. 3 may conduct one or more slice configuration remedial measures in the one of the plurality of domains in response to detect the one or more slice configuration errors in the one of the plurality of domains.

Figure 8:
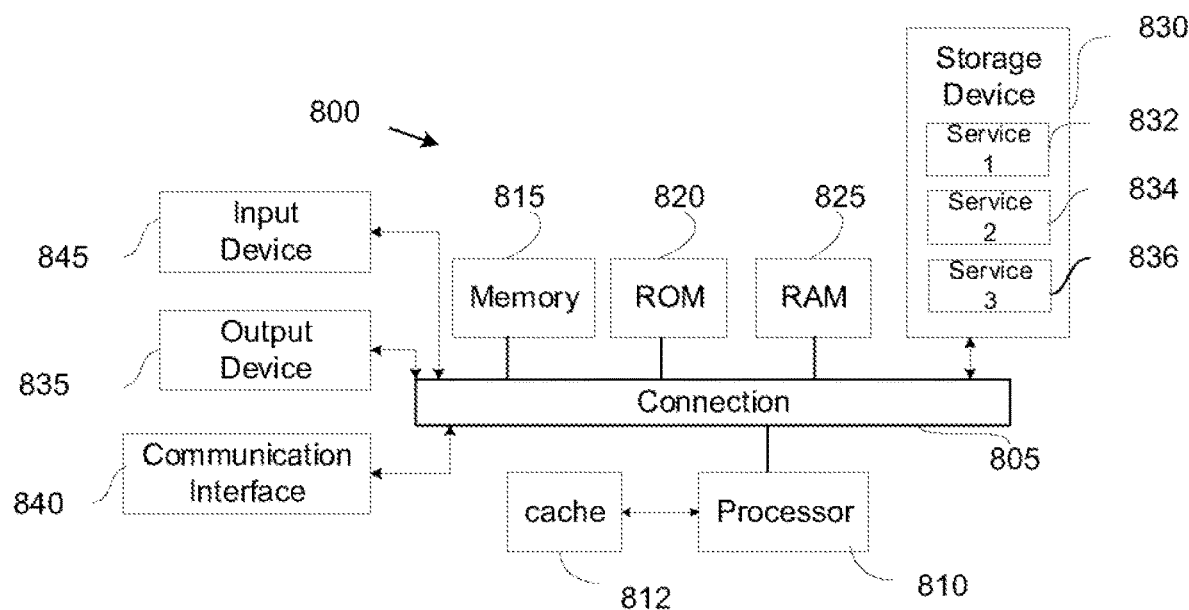
FIG. 8 shows an example computing system, which can be for example any computing device that can implement components of the system.

FIG. 8 illustrates an example computing system 800 including components in electrical communication with each other using a connection 805 upon which one or more aspects of the present disclosure can be implemented. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

Figure 9:
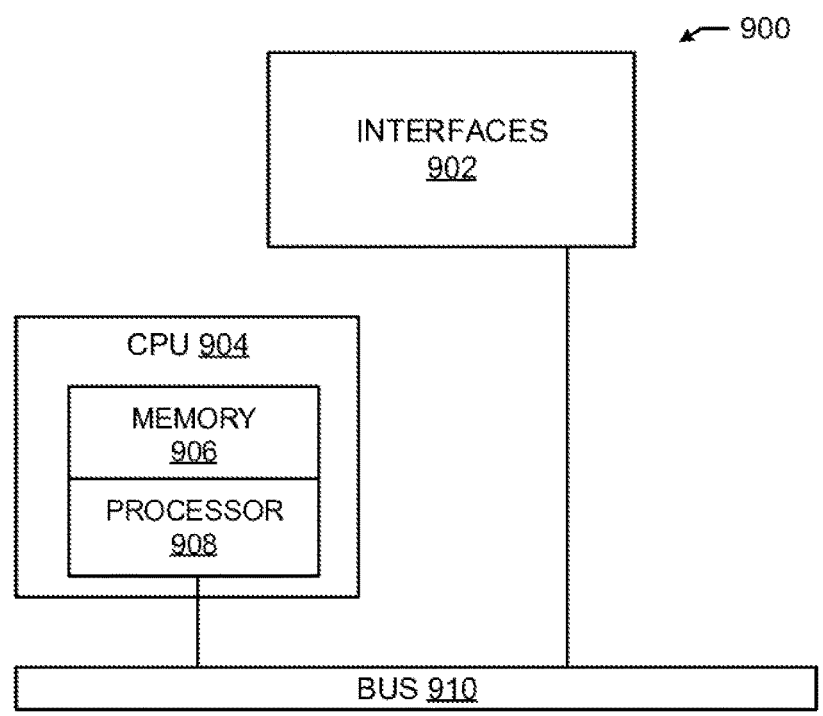
FIG. 9 illustrates an example network device.

FIG. 9 illustrates an example network device 900 suitable for performing switching, routing, load balancing, and other networking operations. Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 904 to efficiently perform routing computations, network diagnostics, security functions, etc.

Although the system shown in FIG. 9 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
generating a common attribute including at least a Border Gateway Protocol Slice Identifier (BGP-Slice ID) for a specific network slice, wherein the specific network slice spans a plurality of different domains through a plurality of sub-slices;
mapping domain-specific attributes associated with sub-slices of the specific network slice to the common attribute;
distributing the mapping of the domain-specific attributes to the common attribute to the plurality of different domains; and
stitching the sub-slices together from the domain-specific attributes based on the common attribute to stitch the specific network slice across the plurality of different domains to yield at least end-to-end network slicing across the plurality of different domains utilizing the common attribute.

2. The method of claim 1, further comprising:
transmitting corresponding domain-specific subsets of the mapping to each of the plurality of different domains; and
facilitating exchange of the corresponding domain-specific subsets of the mapping between the plurality of different domains in order to facilitate distribution of the mapping of the domain-specific attributes to the BGP-Slice ID across the plurality of different domains.

3. The method of claim 2, wherein the corresponding domain- specific subsets of the mapping are exchanged between the plurality of different domains through BGP updates.

4. The method of claim 2, wherein the corresponding domain- specific subsets of the mapping are transmitted to corresponding controllers of the plurality of different domains from a centralized cross-domain orchestrator.

5. The method of claim 2, wherein the corresponding domain- specific subsets of the mapping are transmitted to the plurality of different domains through corresponding domain-specific templates.

6. The method of claim 1, further comprising:
identifying that an error exists in the mapping of the domain-specific attributes and the BGP ID in at least one of the plurality of different domains; and transmitting a feedback informing the existence of the error in the mapping of the domain-specific attributes and the BGP-Slice ID from the at least one of the plurality of domains for performing one or more remedial measures.

7. The method of claim 6, wherein one or more remedial measures includes facilitating redistribution of the mapping of the domain-specific attributes and the BGP-Slice ID to the at least one of the plurality of domains.

8. The method of claim 6, wherein the one or more remedial measures further comprises:
performing a slice configuration check in the at least one of the plurality of different domains to detect one or more slice configuration errors in the at least one of the plurality of different domains; and
conducting one or more slice configuration remedial measures in the at least one of the plurality of different domains in response to detecting the one or more slice configuration errors in the at least one of the plurality of different domains.

9. The method of claim 8, wherein the one or more slice configuration remedial measures include one or a combination of reverting back to a previous slice configuration in the at least one of the plurality of different domains; re-distributing a desired slice configuration to the at least one of the plurality of different domains; and distributing a configuration difference between a current slice configuration and the desired slice configuration to the at least one of the plurality of different domains.

10. The method of claim 1, wherein the domain-specific attributes include a description of characteristics of the sub-slices.

11. The method of claim 1, wherein the domain-specific attributes include one or more parameters to identify a link between the sub-slices across the plurality of different domains.

12. The method of claim 1, further comprising:
determining, at least a portion, of a routing policy for forwarding data across the plurality of different domains through one or more network slices including the specific network slice based on the mapping of the domain-specific attributes and the BGP-Slice ID.

13. The method of claim 1, further comprising:
mapping the domain-specific attributes to a plurality of BGP-Slice IDs including the BGP-Slice ID.

14. A system comprising:
one or more processors; and
at least one computer-readable storage medium having stored therein instructions which, when executed by the one or more processors, cause the one or more processors to perform operations comprising:
generating a common attribute including at least a Border Gateway Protocol Slice Identifier (BGP-Slice ID) for a specific network slice, wherein the specific network slice spans a plurality of different domains through a plurality of sub-slices;
mapping domain-specific attributes associated with sub-slices of the specific network slice to the common attribute;
distributing the mapping of the domain-specific attributes to the common attribute to the plurality of different domains; and
stitching the sub-slices together from the domain-specific attributes based on the common attribute to stitch the specific network slice across the plurality of different domains to yield at least end-to-end network slicing across the plurality of different domains utilizing the common attribute.

15. The system of claim 14, wherein the instructions which, when executed by the one or more processors, further cause the one or more processors to perform operations comprising:
transmitting corresponding domain-specific subsets of the mapping to each of the plurality of different domains; and
facilitating exchange of the corresponding domain-specific subsets of the mapping between the plurality of different domains in order to facilitate distribution of the mapping of the domain-specific attributes to the BGP-Slice ID across the plurality of different domains.

16. The system of claim 14, wherein the instructions which, when executed by the one or more processors, further cause the one or more processors to perform operations comprising:
identifying that an error exists in the mapping of the domain-specific attributes and the BGP-Slice ID in at least one of the plurality of different domains; and
transmitting a feedback informing the existence of the error in the mapping of the domain-specific attributes and the BGP-Slice ID from the at least one of the plurality of different domains for performing one or more remedial measures.

17. The system of claim 14, wherein the instructions which, when executed by the one or more processors, further cause the one or more processors to perform operations comprising:
determining, at least a portion, of a routing policy for forwarding data across the plurality of different domains through one or more network slices including the specific network slice based on the mapping of the domain-specific attributes and the BGP-Slice ID.

18. A non-transitory computer-readable storage medium having stored therein instructions which, when executed by a processor, cause the processor to perform operations comprising:
generating a common attribute including at least a Border Gateway Protocol Slice Identifier (BGP-Slice ID) for a specific network slice, wherein the specific network slice spans a plurality of different domains through a plurality of sub-slices;
mapping domain-specific attributes associated with sub-slices of the specific network slice to the common attribute;
distributing the mapping of the domain-specific attributes to the common attribute to the plurality of different domains; and
stitching the sub-slices together from the domain-specific attributes based on the common attribute to stitch the specific network slice across the plurality of different domains to yield at least end-to-end network slicing across the plurality of different domains utilizing the common attribute.

19. The computer readable medium of claim 18, wherein the instructions which, when executed by the processor, further cause the processor to perform operations comprising:
transmitting corresponding domain-specific subsets of the mapping to each of the plurality of different domains; and
facilitating exchange of the corresponding domain-specific subsets of the mapping between the plurality of different domains in order to facilitate distribution of the mapping of the domain-specific attributes to the BGP-Slice ID across the plurality of different domains.

20. The computer readable medium of claim 18, wherein the instructions which, when executed by the processor, further cause the processor to perform operations comprising:
identifying that an error exists in the mapping of the domain-specific attributes and the BGP-Slice ID in at least one of the plurality of different domains; and
transmitting a feedback informing the existence of the error in the mapping of the domain-specific attributes and the BGP-Slice ID from the at least one of the plurality of different domains for performing one or more remedial measures.

* * * * *